United States Patent
Lee et al.

(10) Patent No.: US 11,981,236 B2
(45) Date of Patent: May 14, 2024

(54) CONVERTIBLE SEAT FOR VEHICLE

(71) Applicants: HYUNDAI MOTOR COMPANY, Seoul (KR); KIA CORPORATION, Seoul (KR)

(72) Inventors: Jang Hyeon Lee, Gunpo-si (KR); Dae Sung Kwon, Seoul (KR); Dong Gu Kim, Suwon-si (KR); Il Seon Yoo, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 84 days.

(21) Appl. No.: 17/969,206

(22) Filed: Oct. 19, 2022

(65) Prior Publication Data
US 2023/0150404 A1 May 18, 2023

(30) Foreign Application Priority Data

Nov. 16, 2021 (KR) ........................ 10-2021-0157269

(51) Int. Cl.
*B60N 2/30* (2006.01)
*B60N 2/02* (2006.01)

(52) U.S. Cl.
CPC .......... *B60N 2/3086* (2013.01); *B60N 2/0268* (2023.08)

(58) Field of Classification Search
CPC .... B60N 2/3086; B60N 2/0268; B60N 2/914; B60N 2/0244; B60N 2/0272; B60N 2/02246; B60N 2/002; B60N 2/0224; B60N 2/32; B60N 2/36
See application file for complete search history.

(56) References Cited

U.S. PATENT DOCUMENTS

| | | | |
|---|---|---|---|
| 2013/0019402 A1* | 1/2013 | Vervoort | A47C 17/86 5/412 |
| 2016/0286968 A1* | 10/2016 | Warren | A47C 17/14 |
| 2021/0114487 A1* | 4/2021 | Han | B60N 2/1814 |

FOREIGN PATENT DOCUMENTS

| KR | 10-1694716 B1 | 1/2017 |
|---|---|---|
| KR | 10-2114456 B1 | 5/2020 |

* cited by examiner

*Primary Examiner* — Mark R Wendell
(74) *Attorney, Agent, or Firm* — Morgan, Lewis & Bockius LLP

(57) ABSTRACT

A convertible seat for a vehicle includes a base frame having a predetermined dimension of storage space, a plurality of individual blocks disposed to be ascendable and descendable in the storage space of the base frame and configured to serve as a seatback and a seat cushion, and a raising and lowering drive device installed in each of the individual blocks and configured to raise or lower a corresponding one of the individual blocks so that a seat position can be changed into various forms.

12 Claims, 7 Drawing Sheets

"INDIVIDUAL BLOCKS AROUND INDIVIDUAL BLOCKS SENSING PRESSURE"

"INDIVIDUAL BLOCKS SENSING PRESSURE"

CONVERTIBLE SEAT FOR VEHICLE

CROSS-REFERENCE TO RELATED APPLICATION

This application claims under 35 U.S.C. § 119(a) the benefit of priority to Korean Patent Application No. 10-2021-0157269 filed on Nov. 16, 2021, the entire contents of which are incorporated herein by reference.

BACKGROUND

(a) Technical Field

The present disclosure relates to a convertible seat for a vehicle, and more particularly, to a convertible seat for a vehicle, which includes a seatback and a seat cushion each having a plurality of individual blocks capable of ascending and descending so as to change a seat position into various forms.

(b) Background Art

Generally, a seat of a vehicle is manufactured in a structure which basically includes a seat cushion for seating, a seatback for leaning back, and a headrest for supporting the neck and head. In addition to the above structure, in order to implement a free change in seat position according to a body type and a situation of a passenger, various mechanisms for adjusting a seat position are being applied to the seat.

For example, the various mechanisms for adjusting a seat position may include a mechanism for adjusting a seat height, a mechanism for implementing a relaxation comfort posture, and a seatback reclining mechanism.

In particular, a purpose built vehicle (PBV), which is a type of autonomous vehicle, is manufactured for various purposes such as an auto camping space, a residence and rest space, a mobile warehouse, a logistics delivery space, a mobile hospital, and a food truck. Therefore, it is preferable that the PBV is equipped with seats suitable for the above purposes.

Accordingly, there is a demand for a seat mechanism capable of adjusting various seat positions desired by the passenger and adjusting a seat position according to a body type and a situation of the passenger.

The information disclosed in the Background section above is to aid in the understanding of the background of the present disclosure, and should not be taken as acknowledgement that this information forms any part of prior art.

SUMMARY OF THE DISCLOSURE

The present disclosure has been made in an effort to solve the above-described problems associated with prior art.

In one aspect, the present disclosure provides a convertible seat for a vehicle, which includes a seatback and a seat cushion each having a plurality of individual blocks capable of ascending and descending so as to change a seat position into various forms according to a body type and a situation of a passenger.

Objectives of the present disclosure are not limited to the above-described features, and other objectives of the present disclosure, which are not mentioned, can be understood by the following description and also will be apparently understood through embodiments of the present disclosure. Further, various aspects of the present disclosure can be realized by features described in the appended claims and a combination thereof.

In an exemplary embodiment, the present disclosure provides a convertible seat for a vehicle, which includes a base frame having a predetermined dimension of storage space, a plurality of individual blocks disposed to be ascendable and descendable in the storage space of the base frame, and a raising and lowering drive device installed in each of the individual blocks and configured to raise and lower a corresponding one of the individual blocks.

Each of the individual blocks may include a fixed block fixed to the base frame, and an ascending and descending block disposed to be ascendable and descendable and configured to surround the fixed block.

The raising and lowering drive device may be employed as a linear actuator including a cylinder mounted on a bottom of the fixed block of the corresponding one of the individual blocks, and a piston rod connected to the ascending and descending block of the corresponding one of the individual blocks.

Alternatively, the raising and lowering drive device may be employed as a scissor lift device including a base mounted on a bottom of the fixed block of the corresponding one of the individual blocks, a scissor frame having a lower end portion connected to the base and an upper end portion connected to the ascending and descending block of the corresponding one of the individual blocks, and an electric cylinder mounted on the scissor frame and configured to raise and lower the scissor frame.

In addition, the convertible seat may include a controller, a pressure sensor configured to detect a body pressure of a passenger and to transmit a detection signal to the controller and mounted on each individual block, and a proximity sensor configured to detect whether the passenger is seated and to transmit a detection signal to the controller and mounted on an individual block serving as a seatback among the individual blocks.

The controller may be configured to receive signals from pressure sensors, which actually sense the body pressure of the passenger, among the pressure sensors installed in the individual blocks, calculate an average pressure out of magnitudes of the pressure sensors, which actually sense the body pressure of the passenger, calculate a magnitude of an individual pressure of each of the pressure sensors which actually sense the body pressure of the passenger, and then control driving of the raising and lowering drive device in the corresponding one of the individual blocks, on which the individual pressure acts, in an ascending or descending direction according to a result of comparing the magnitude of the individual pressure with the average pressure.

In addition, the controller may be configured to control driving of the raising and lowering drive device in the corresponding one of the individual blocks, on which the individual pressure acts, in an ascending direction when the magnitude of the individual pressure is smaller than the average pressure, to control the driving of the raising and lowering drive device in the corresponding one of the individual blocks, on which the individual pressure acts, in a descending direction when the magnitude of the individual pressure is greater than the average pressure, and to stop the driving of the raising and lowering drive device in the corresponding one of the individual blocks, on which the individual pressure acts, when the magnitude of the individual pressure is equal to the average pressure.

In addition, when the controller receives a pressure detection signal of the pressure sensor actually sensing the body pressure of the passenger among the pressure sensors installed in the individual blocks and then receives a detection signal of the proximity sensor, the controller may be configured to control driving of the raising and lowering drive devices in the individual blocks disposed at the periphery of the individual blocks on which the body pressure of the passenger actually acts, in the ascending direction.

Meanwhile, a seat cushion extension device may be mounted at a front end portion and a bottom of the base frame, and the seat cushion extension device may include an extension pad mounted in the front end portion of the base frame using a hinge, and a single actuator including a cylinder mounted on a lower panel of the base frame and a piston rod connected to a bottom portion of the extension pad using a hinge.

Alternatively, a seat cushion extension device may be mounted at a front end portion and a bottom position of the base frame, and the seat cushion extension device may include a first actuator mounted on a lower panel of the base frame, an extension pad support block connected to a piston rod of the first actuator and configured to move forward or backward, a second actuator mounted on the extension pad support block, and an extension pad connected to a piston rod of the second actuator, disposed on the extension pad support block, and configured to ascend and descend together with the piston rod of the second actuator when the piston rod of the second actuator ascends and descends.

Other aspects and preferred embodiments of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
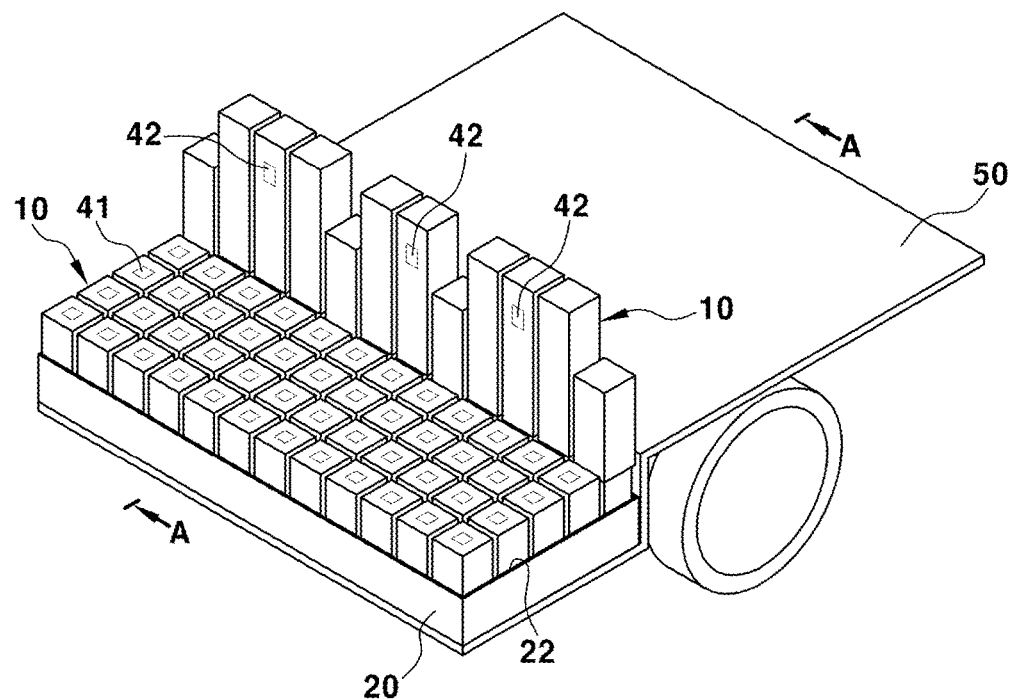
FIG. 1 is a perspective view illustrating a state in which each individual block of a convertible seat for a vehicle switched to a default seating mode according to one exemplary embodiment of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, exemplary embodiments of the present disclosure will be described in detail with reference to the accompanying drawings.

Figure 2:
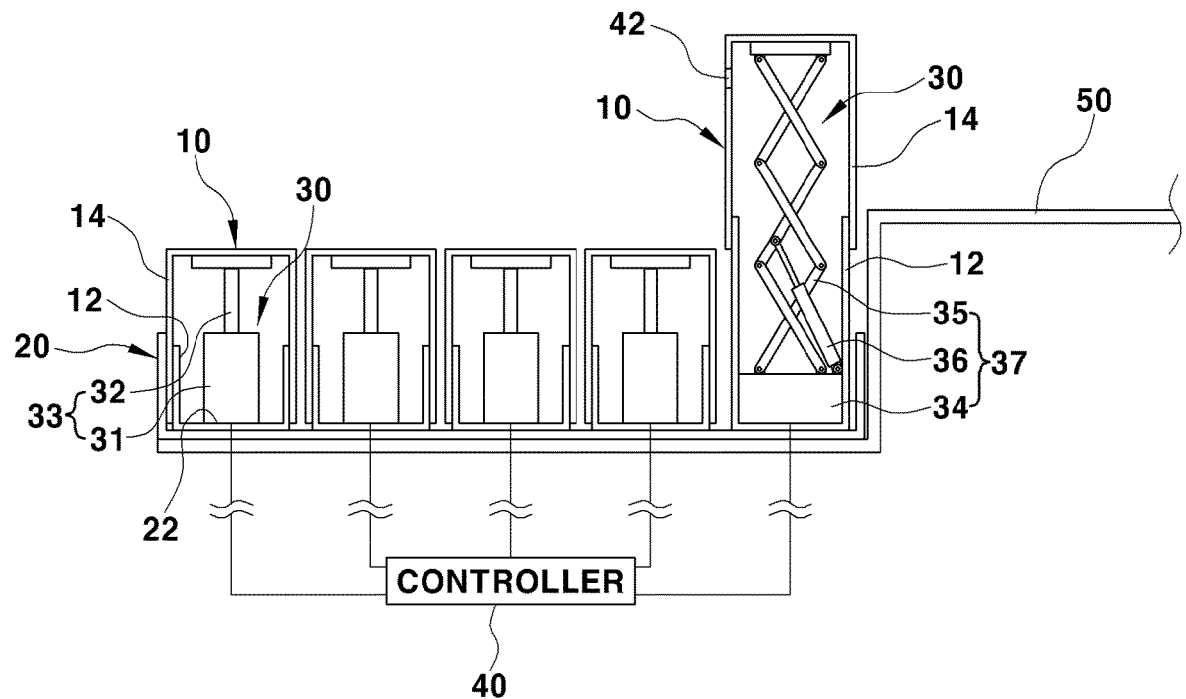
FIG. 2 is a side cross-sectional view taken along line A-A of FIG. 1.

FIG. 1 is a perspective view illustrating a state in which each individual block of a convertible seat for a vehicle is switched to a default seating mode according to the present disclosure, FIG. 2 is a side cross-sectional view taken along line A-A of FIG. 1, and a reference numeral 20 denotes a base frame.

The base frame 20 is manufactured in a structure which has an open upper portion and a predetermined size of storage space 22. The base frame 20 may be mounted on an indoor floor panel of a vehicle.

In particular, in the storage space 22 of the base frame 20, a plurality of individual blocks 10 serving as a seatback and a seat cushion are disposed to be ascendable and descendable. A raising and lowering drive device 30 for raising and lowering each individual block 10 is installed in each individual block 10.

In this case, as shown in FIG. 2, the individual block 10 includes an upper open-type fixed block 12 fixedly mounted in the storage space 22 of the base frame 20, and a lower open-type ascending and descending block 14 which surrounds the fixed block 12 and is disposed to be ascendable and descendable.

Actually, the ascending and descending block 14 of the individual blocks 10 is raised and lowered due to driving of the raising and lowering drive device 30.

That is, the ascending and descending block 14 ascends due to upward driving of the raising and lowering drive device 30 in a state in which the fixed block 12 is fixed, and the ascending and descending block 14 descends due to downward driving of the raising and lowering drive device 30.

As shown in FIG. 2, the raising and lowering drive device 30 may be employed as a linear actuator 33 including a cylinder 31 mounted on a bottom of the fixed block 12 of the individual block 10 and a piston rod 32 connected to a bottom of the ascending and descending block 14 of the individual block 10.

In this case, the linear actuator 33 is a type of electric cylinder and, when electric power is supplied thereto, the piston rod 32 performs forward and backward motion by a gear train in the cylinder 31.

Thus, when the piston rod 32 of the linear actuator 33 ascends, the piston rod 32 pushes upward the ascending and descending block 14 of the individual block 10, and thus an ascending operation of the individual block 10, that is, an ascending operation of the ascending and descending block 14, may be performed.

On the other hand, when the piston rod 32 of the linear actuator 33 descends, the piston rod 32 pulls the ascending and descending block 14 of the individual block 10, and thus a descending operation of the individual block 10, that is, a descending operation of the ascending and descending block 14, may be performed.

Alternatively, as shown in FIG. 2, the raising and lowering drive device 30 may be employed as a scissor lift device 37 including a base 34 mounted on the bottom of the fixed block 12 of the individual block 10, a scissor frame 35 having a lower end portion connected to the base 34 and an upper end portion connected to the bottom of the ascending and descending block 14 of the individual block 10, and an electric cylinder 36 mounted at a predetermined position of the scissor frame 35 and configured to raise and lower the scissor frame 35.

Accordingly, when the electric power is supplied to the electric cylinder 36 of the scissor lift device 37, the scissor frame 35 is deployed in an ascending direction due to a forward movement of a piston rod of the electric cylinder 36. Simultaneously, the scissor frame 35 pushes upward the ascending and descending block 14 of the individual block 10 so that the ascending operation of individual block 10, that is, the ascending operation of the ascending and descending block 14, may be performed.

On the other hand, due to a backward movement of the piston rod of the electric cylinder 36, the scissor frame 35 is folded and contracted in a descending direction and, simultaneously, the scissor frame 35 pulls the ascending and descending block 14 of the individual block 10 so that the descending operation of the individual block 10, that is, the descending operation of the ascending and descending block 14, may be performed.

Preferably, individual blocks 10 in the rearmost row among the plurality of individual blocks 10 need to each have a longer vertical ascending and descending distance so as to serve as a seatback.

To this end, it is preferable that the scissor lift device 37, which has a longer vertical motion distance than that of the linear actuator 33, is employed as a raising and lowering drive device mounted in the individual blocks 10 in the rearmost row among the plurality of individual blocks 10, and the linear actuator 33 is employed as a raising and lowering drive device mounted in individual blocks 10 in the remaining rows among the plurality of individual blocks 10.

Further, a pressure sensor 41 for detecting a body pressure of the passenger and transmitting the detection signal to a controller 40 is mounted in each individual block 10, and a proximity sensor 42 for detecting whether the passenger is seated and transmitting the detection signal to the controller 40 is installed in individual blocks 10 serving as a seatback among the individual blocks 10.

In particular, the controller 40 is configured to receive signals from the pressure sensors 41, which actually sense the body pressure of the passenger, among the pressure sensors 41 installed in the individual blocks 10, calculate an average pressure out of magnitudes of the pressure sensors 41, which actually sense the body pressure of the passenger, calculate a magnitude of an individual pressure of each pressure sensor 41 which actually senses the body pressure of the passenger, and then control driving of the raising and lowering drive device 30 in the individual block 10, on which the individual pressure acts, according to a result of comparing the magnitude of the individual pressure with the average pressure, in an ascending or descending direction.

For example, when the individual pressure of each pressure sensor 41 actually sensing the body pressure of the passenger is smaller than the average pressure of the pressure sensors 41 actually sensing the body pressure of the passenger, the controller 40 controls the driving of the raising and lowering drive device 30 in the individual block 10, on which the individual pressure acts, in the ascending direction. When the individual pressure is greater than the average pressure, the controller 40 controls the driving of the raising and lowering drive device 30 in the individual block 10, on which the individual pressure acts, in the descending direction.

In this case, when the individual pressure is equal to the average pressure, the controller 40 stops the driving of the raising and lowering drive device 30 in the individual block 10 on which the individual pressure acts.

In this way, according to the magnitude of the individual pressure when compared to the average pressure in response to the detection signal of the pressure sensor 41, a height of the individual block 10 on which the actual body pressure acts is controlled to ascend or descend so that it is possible to provide a seat cushion suitable for the body type of the passenger.

In addition, when the controller 40 receives the individual pressure of the pressure sensors 41 actually sensing the body pressure of the passenger among the pressure sensors 41 mounted in the individual blocks 10 and then receives the detection signal of the proximity sensor 42, the controller 40 determines that the passenger has actually ridden in a vehicle and controls driving of the raising and lowering drive device 30 in each individual block 10, which is disposed around the individual block 10 on which the individual pressure acts, in the ascending direction. Accordingly, in addition to the individual block 10 on which the individual pressure acts, the individual blocks 10 disposed around the individual block 10 ascend to serve as an armrest and also perform a function of limiting a boarding space for infants or companion animals.

Meanwhile, for switching to a desired seat deformation mode among the default seating mode, a child seat mode, and a full-bed mode, the controller 40 is configured to selectively raise and lower the individual blocks 10 according to desired heights and store positions of the height-adjusted individual blocks 10 in a memory.

Here, an operation example of the convertible seat of the present disclosure, which has the above-described configuration, will be described as follows.

Default Seating Mode

Figure 3:
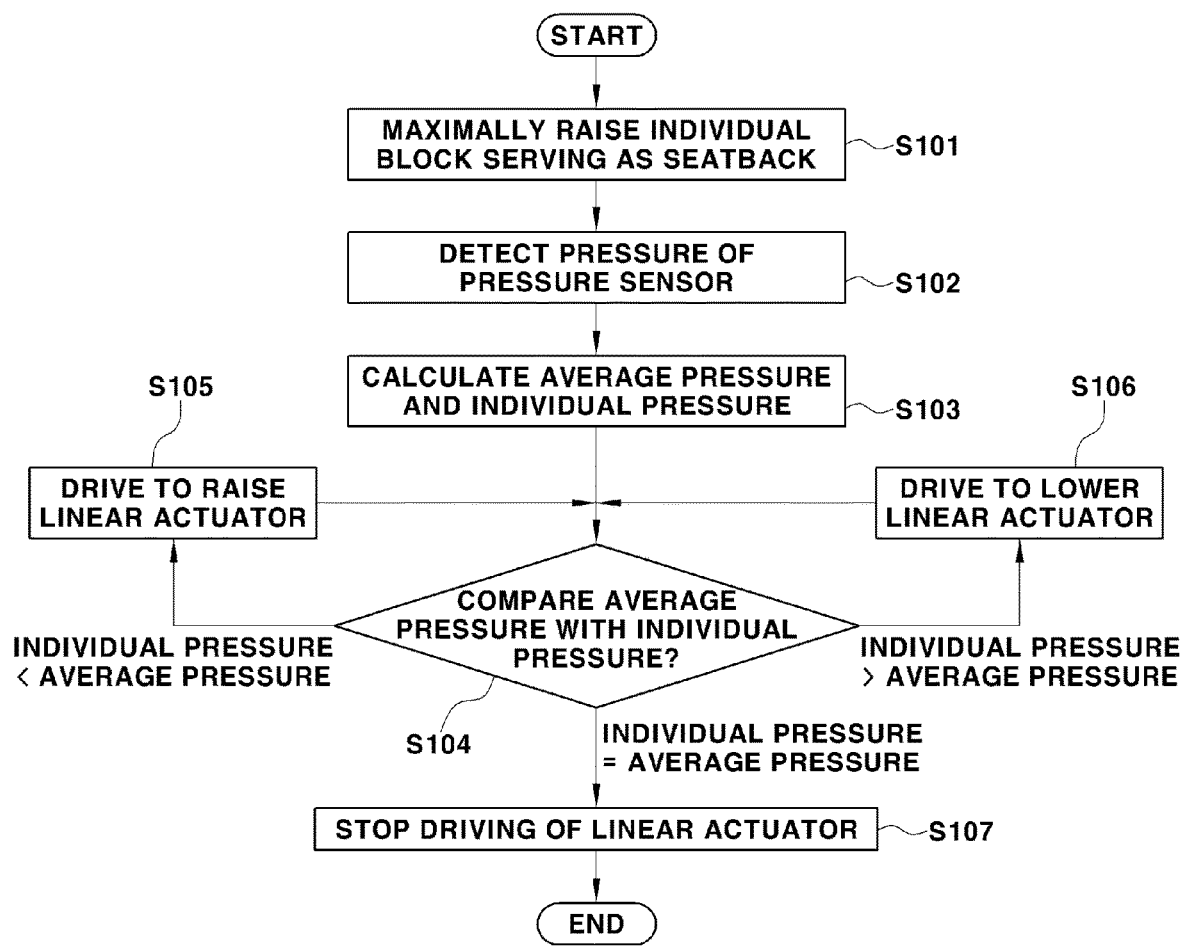
FIG. 3 is a flowchart illustrating an example in which the raising and lowering of each individual block of the convertible seat for a vehicle is controlled to be raised and lowered and controlled according to a body type of a passenger according to one exemplary embodiment of the present disclosure.

FIGS. 1 and 2 illustrate a state in which each individual block of the convertible seat for a vehicle is switched to a default seating mode according to the present disclosure, and FIG. 3 is a flowchart illustrating an example in which the raising and lowering of each individual block of the convertible seat for a vehicle is controlled to be raised and lowered and controlled to fit a body type of a passenger according to the present disclosure.

The default seating mode refers to a mode in which a general adult can be seated.

To this end, first, individual blocks 10 in the rearmost row, which serves as a seatback among the plurality of individual blocks 10, are maximally raised (S101).

In this case, as described above, the scissor lift device 37 is employed as the raising and lowering drive device 30 installed in the individual block 10 in the rearmost row so that the individual block 10, that is, the ascending and descending block 14, may be easily raised to a height enough to serve as a seatback function.

Next, the pressure sensor 41, which actually senses the body pressure of the passenger, among the pressure sensors 41 respectively mounted in the plurality of individual blocks 10 detects the body pressure of the passenger, and transmits the detection signal for detected pressure to the controller 40 (S102).

Subsequently, the controller 40 receives signals from the pressure sensors 41 actually sensing the body pressure of the passenger among the pressure sensors 41, which are installed in the individual blocks 10 and serves as the seat cushion, calculates an average pressure out of magnitudes of the pressure sensors 41, which actually sense the body pressure of the passenger, and calculates a magnitude of an individual pressure of each pressure sensor 41 actually sensing the body pressure the passenger (S103).

Next, the controller 40 compares a magnitude of the average pressure with the magnitude of the individual pressure (S104).

When the comparison result indicates that the individual pressure of each pressure sensor 41 actually sensing the body pressure of the passenger is smaller than the average pressure of the pressure sensors 41 actually sensing the body pressure of the passenger, the controller 40 controls driving of the raising and lowering drive device 30 in the individual block 10, on which the individual pressure acts, in the ascending direction (S105).

On the other hand, when the comparison result indicates that the individual pressure of each pressure sensor 41 actually sensing the body pressure of the passenger is greater than the average pressure of the pressure sensors 41 actually sensing the body pressure of the passenger, the controller 40 controls driving of the raising and lowering drive device 30 in the individual block 10, on which the individual pressure acts, in the descending direction (S106).

In this case, the piston rod 32 of the linear actuator 33 employed as the raising and lowering drive device 30 ascends to push upward the ascending and descending block 14 of the individual block 10 so that an ascending operation of the individual block 10, that is, an ascending operation of the ascending and descending block 14 may be performed. The piston rod 32 of the linear actuator 33 descends to pull the ascending and descending block 14 of the individual block 10 so that a descending operation of the individual block 10, that is, a descending operation of the ascending and descending block 14, may be performed.

In this case, when the comparison result indicates that the individual pressure is equal to the average pressure, the controller 40 stops the driving of the raising and lowering drive device 30 in the individual block 10 on which the individual pressure acts (S107).

As described above, according to the magnitude of the individual pressure of each pressure sensor 41 actually sensing the body pressure of the passenger when compared with the average pressure calculated by receiving signals from the pressure sensors 41 actually sensing the body pressure passenger, the height of the individual block 10 on which the body pressure actually acts is adjusted, which makes it possible to distribute a load of the passenger and, simultaneously, provide a seat cushion suitable for the body type of the passenger.

Child Seat Mode

Figure 4:
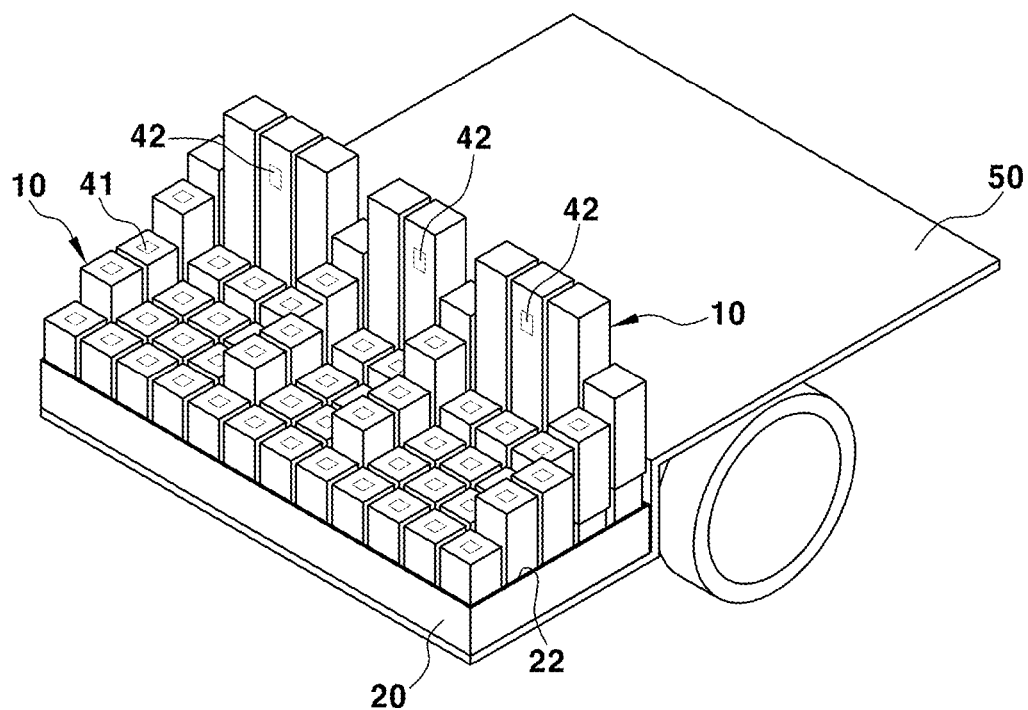
FIG. 4 is a perspective view illustrating a state in which each individual block of the convertible seat for a vehicle is switched to a child seat mode according to one exemplary embodiment of the present disclosure.
Figure 5A:
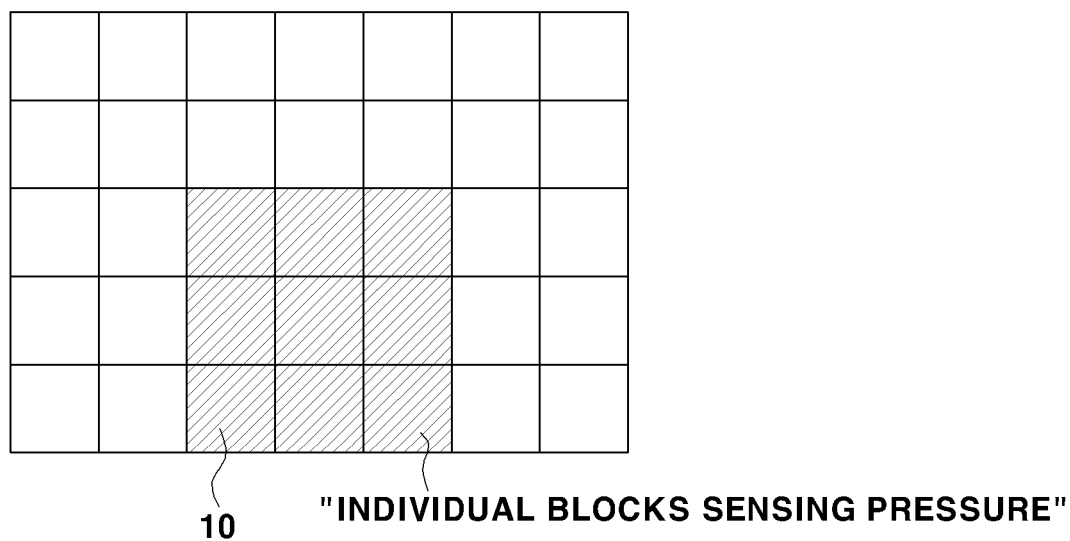
FIGS. 5A, 5B, 5C and 5D are schematic diagrams illustrating an example in which the convertible seat for a vehicle is switched to the child seat mode according to various exemplary embodiments of the present disclosure.
Figure 5B:
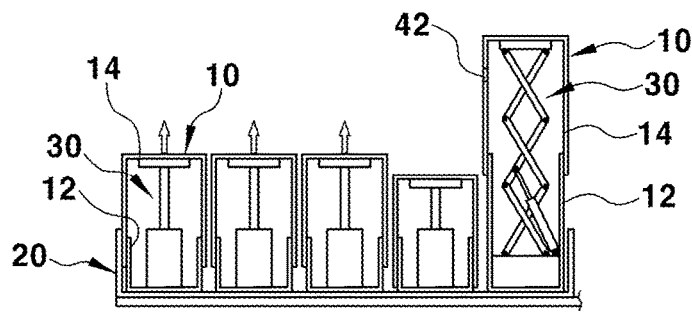
Figure 5C:
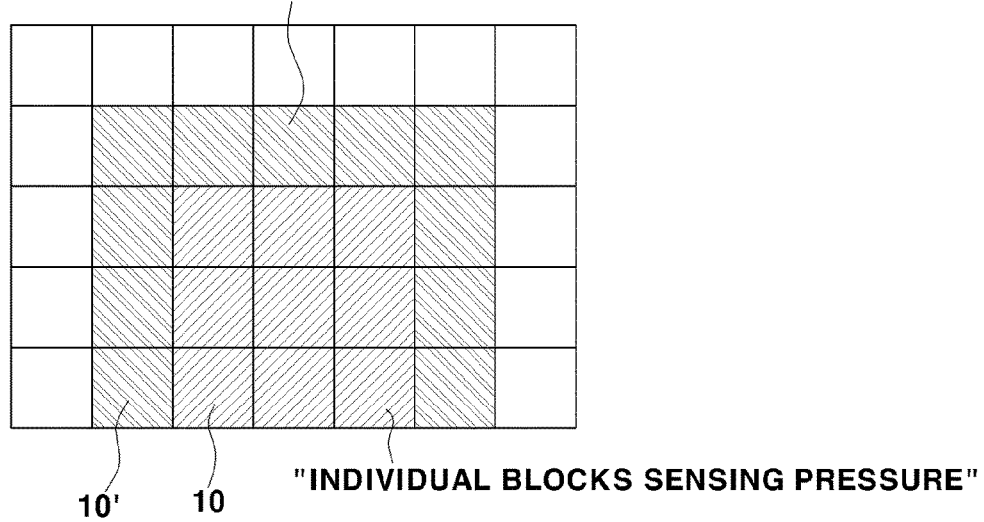
Figure 5D:
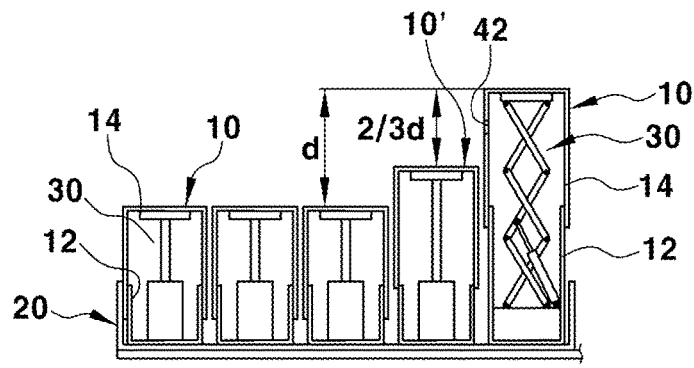
Figure 6:
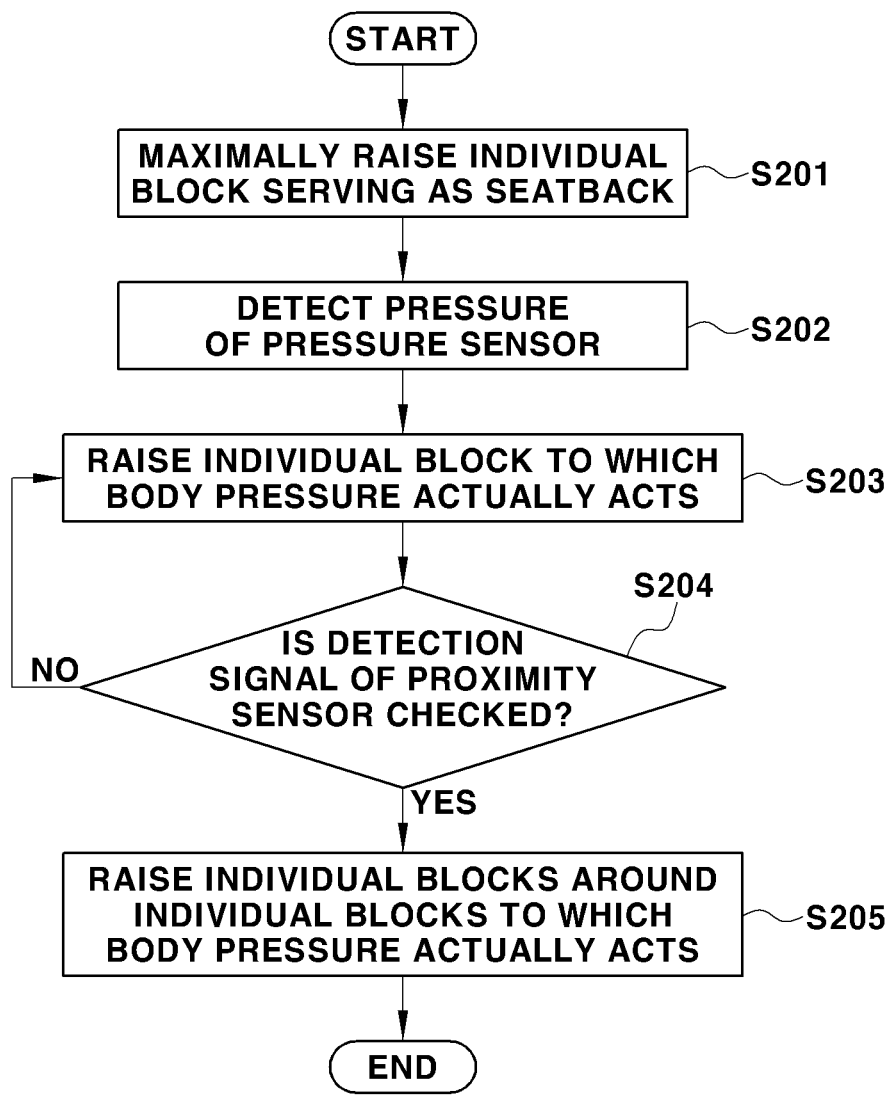
FIG. 6 is a flowchart illustrating a control example when the convertible seat for a vehicle is switched to the child seat mode according to one exemplary embodiment of the present disclosure.

FIG. 4 illustrates a state in which each individual block of the convertible seat for a vehicle is switched to a child seat mode according to the present disclosure, FIGS. 5A to 5D illustrate an example in which the convertible seat for a vehicle is switched to the child seat mode according to the present disclosure, and FIG. 6 is a flowchart illustrating a control example when the convertible seat for a vehicle is switched to the child seat mode according to the present disclosure.

The child seat mode refers to a mode which provides a seating space suitable for a body type of a baby, and when a companion animal is seated, the child seat mode refers to a mode which provides a seating space suitable for a size of the companion animal.

To this end, first, the individual blocks 10 in the rearmost row, which serves as a seatback among the plurality of individual blocks 10, are maximally raised (S201).

In this case, as described above, the scissor lift device 37 is employed as the raising and lowering drive device 30 installed in the individual block 10 in the rearmost row so that the individual block 10, that is, the ascending and descending block 14, may be easily raised to a height enough to serve as a seatback function.

Next, the pressure sensor 41, which actually senses the body pressure of the baby or the companion animal, among the pressure sensors 41 respectively mounted in the plurality of individual blocks 10 detects the pressure of the baby or companion animal, and transmits the detection signal for the detected pressure to the controller 40 (S202).

For example, as shown in FIG. 5A, among the plurality of individual blocks 10, an individual block 10 whose pressure is sensed by the body pressure of the baby or the companion animal may be determined.

Subsequently, after the controller 40 receives signals from the pressure sensors 41 having actually sensed the body pressure of the baby or the companion animal among the pressure sensors 41 installed in the individual blocks 10 serving as a seat cushion, the controller 40 controls the individual block 10, on which the body pressure of the baby or the companion animal actually acts, that is, driving of the raising and lowering drive device 30 in the individual block 10 sensing the body pressure in the ascending direction.

Thus, as shown in FIG. 5B, due to the driving of the raising and lowering drive device 30, the individual block 10 on which the body pressure actually acts, that is, the individual block 10 sensing the body pressure, ascends to a height suitable for the body type of the baby or the companion animal (S203).

More specifically, the piston rod 32 of the linear actuator 33 in the individual block 10, on which the body pressure of the baby or the companion animal actually acts, ascends to push upward the ascending and descending block 14 of the individual block 10 so that, as shown in FIG. 5B, the individual block 10, that is, the ascending and descending block 14, may ascend to a height suitable for the body type of the baby or the companion animal.

Next, the controller 40 checks whether a detection signal of the proximity sensor 42 is present (S204).

In this case, since the proximity sensor 42 is mounted in the individual block 10 in the rearmost row for the seatback, detects whether the passenger is seated, and transmits the detection signal to the controller 40, the controller 40 may check whether the detection signal of the proximity sensor 42 is present.

Subsequently, when the controller 40 receives a pressure detection signal of the pressure sensor 40 actually sensing the body pressure of the passenger (the baby or the companion animal) among the pressure sensors 41, and then receives the detection signal of the proximity sensor 42, the controller 40 controls driving of the raising and lowering drive devices 30 in individual blocks 10', disposed at a periphery (both sides and a rear side) of the individual block 10, in the ascending direction, in addition to the individual block 10 on which the body pressure of the passenger actually acts.

Thus, as shown in FIGS. 5C and 5D, in addition to the individual block 10 on which the body pressure actually acts, the individual blocks 10' disposed at the periphery of individual block 10 ascend to a height for limiting the seating space of the baby or the companion animal due to the driving of the raising and lowering drive device 30 (205).

More specifically, in addition to the individual block 10 on which the body pressure of the baby or the companion animal actually acts, the piston rod 32 of the linear actuator 33 in each of the individual blocks 10' disposed at the periphery (both sides and the rear side) of the individual block 10 ascends to push upward the ascending and descending block 14 of the individual block 10 so that, as shown in FIGS. 5C and 5D, in addition to the individual block 10 on which the body pressure of the passenger actually acts, the individual blocks 10' disposed the periphery (both sides and the rear side) of the individual block 10 may ascend to provide a seating space suitable for the body type of the baby or the companion animal.

Full-Bed Mode

Figure 7:
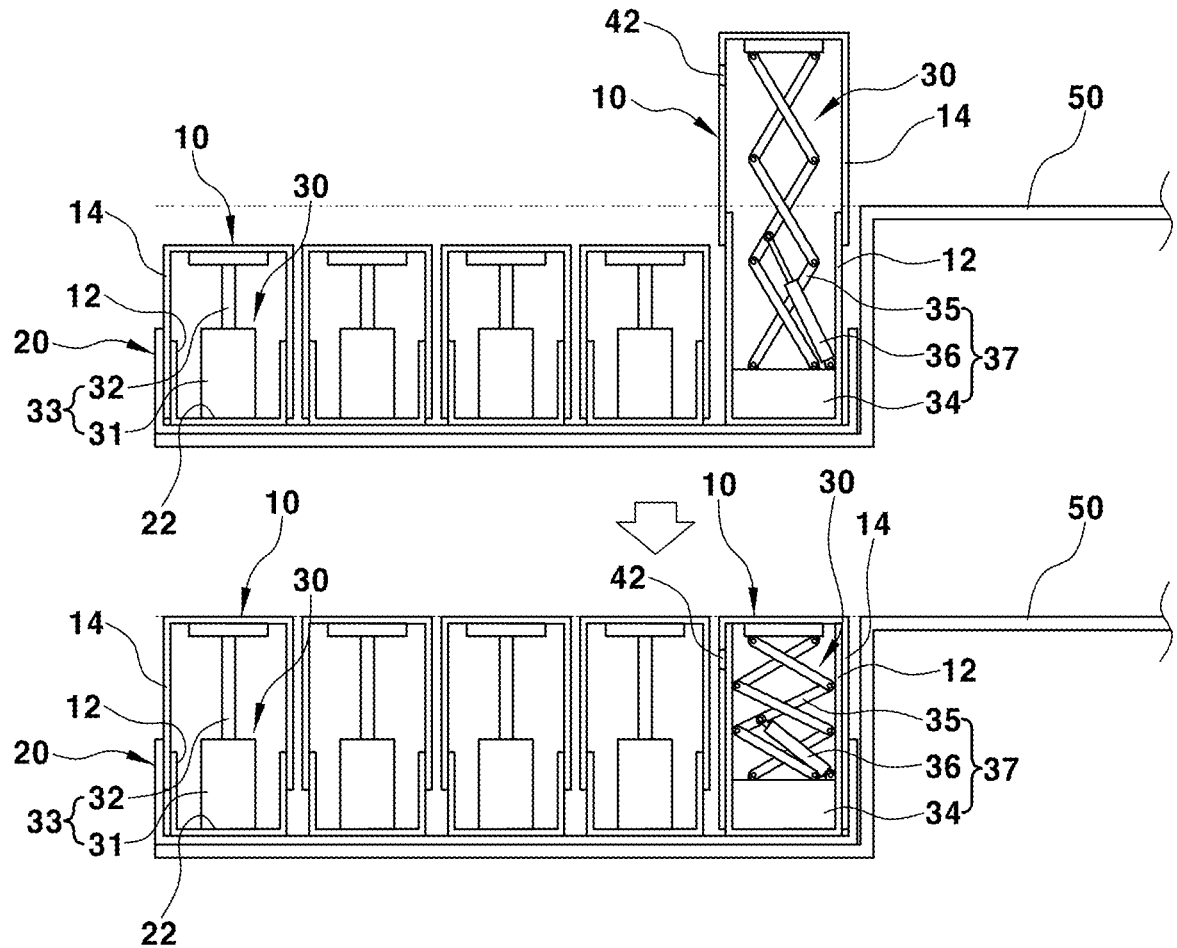
FIG. 7 is a side cross-sectional view illustrating a state in which each individual block of the convertible seat for a vehicle is switched to a full-bed mode according to one exemplary embodiment of the present disclosure.

FIG. 7 is a side cross-section view illustrating a state in which each individual block of the convertible seat for a vehicle is switched to a full-bed mode according to the present disclosure.

The full-bed mode refers to a mode in which upper surfaces of the individual blocks 10 are adjusted to be coplanar with a floor of a luggage room of the vehicle to provide a sleeping and resting space to a user.

To this end, as shown in FIG. 7, the individual blocks 10 in the rearmost row serving as a seatback among the plurality of individual blocks 10 are lowered to a height of the floor of a luggage room 50.

In this case, when electric power is supplied to the electric cylinder 36 of the scissor lift device 37 installed in the individual block 10 in the rearmost row, due to a backward movement of the piston rod of the electric cylinder 36, the scissor frame 35 is folded and contracted in a descending direction and, simultaneously, the scissor frame 35 pulls the ascending and descending block 14 of the individual block 10 so that the descending operation of the individual block 10, that is, the descending operation of the ascending and descending block 14, may be performed.

In addition, as shown in FIG. 7, the individual blocks 10 serving as the seat cushion among the plurality of individual blocks 10 also ascend or descend to a height which is coplanar with the floor of the luggage room 50.

In this case, the piston rod 32 of the linear actuator 33 installed in the individual block 10 serving as the seat cushion ascends or descends so that the ascending operation of the individual block 10, that is, the ascending operation of the ascending and descending block 14, may be performed.

In this way, the present disclosure may provide the full-bed mode for adjusting the plurality of individual blocks 10 to the same height as the luggage room 50, thereby allowing the user to conveniently use the plurality of individual blocks 10 as a sleeping and resting space during auto camping.

Meanwhile, a seat cushion extension device 60 may be further mounted at a front end portion and a bottom position of the base frame 20.

Figure 8:
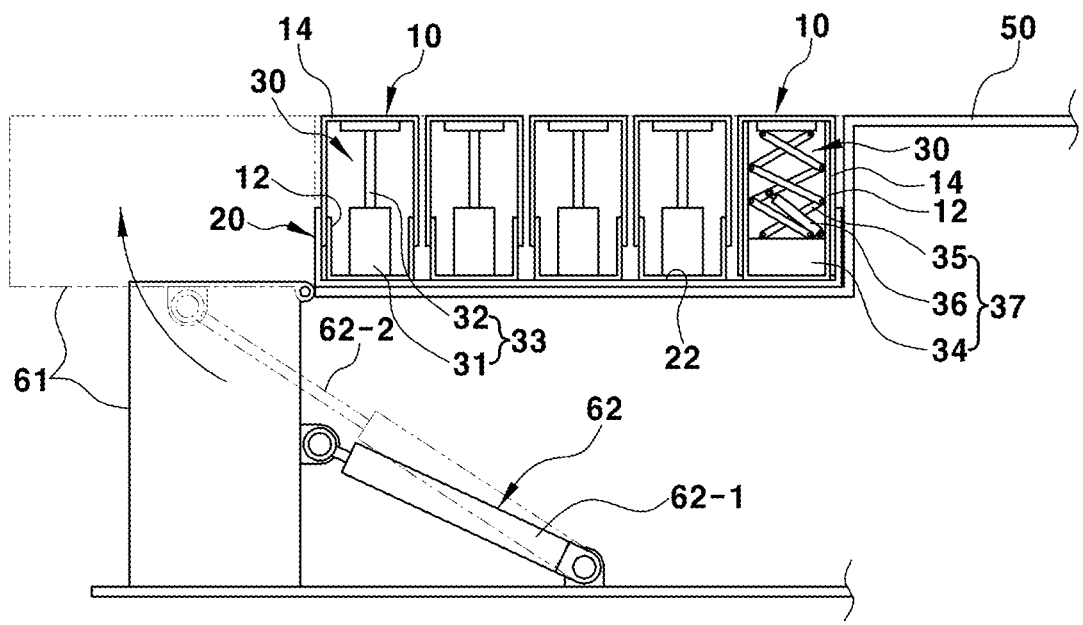
FIG. 8 is a side cross-sectional view illustrating an example in which a seat cushion extension device is mounted on the convertible seat for a vehicle according to one exemplary embodiment of the present disclosure.

FIG. 8 is a side cross-sectional view illustrating an example in which a seat cushion extension device is mounted on the convertible seat for a vehicle according to the present disclosure.

As shown in FIG. 8, the seat cushion extension device 60 may include an extension pad 61 mounted on the front end portion of the base frame 20 using a hinge, and a single actuator 62 including a cylinder 62-1 mounted on a lower panel of the base frame 20 and a piston rod 62-2 connected to a bottom portion of the extension pad 61 using a hinge.

Thus, when electric power is applied to the single actuator 62, the piston rod 62-2 mounted on the cylinder 62-1 moves forward and pushes and deploys the extension pad 61 so that the extension pad 61 becomes coplanar with the individual blocks 10.

Figure 9:
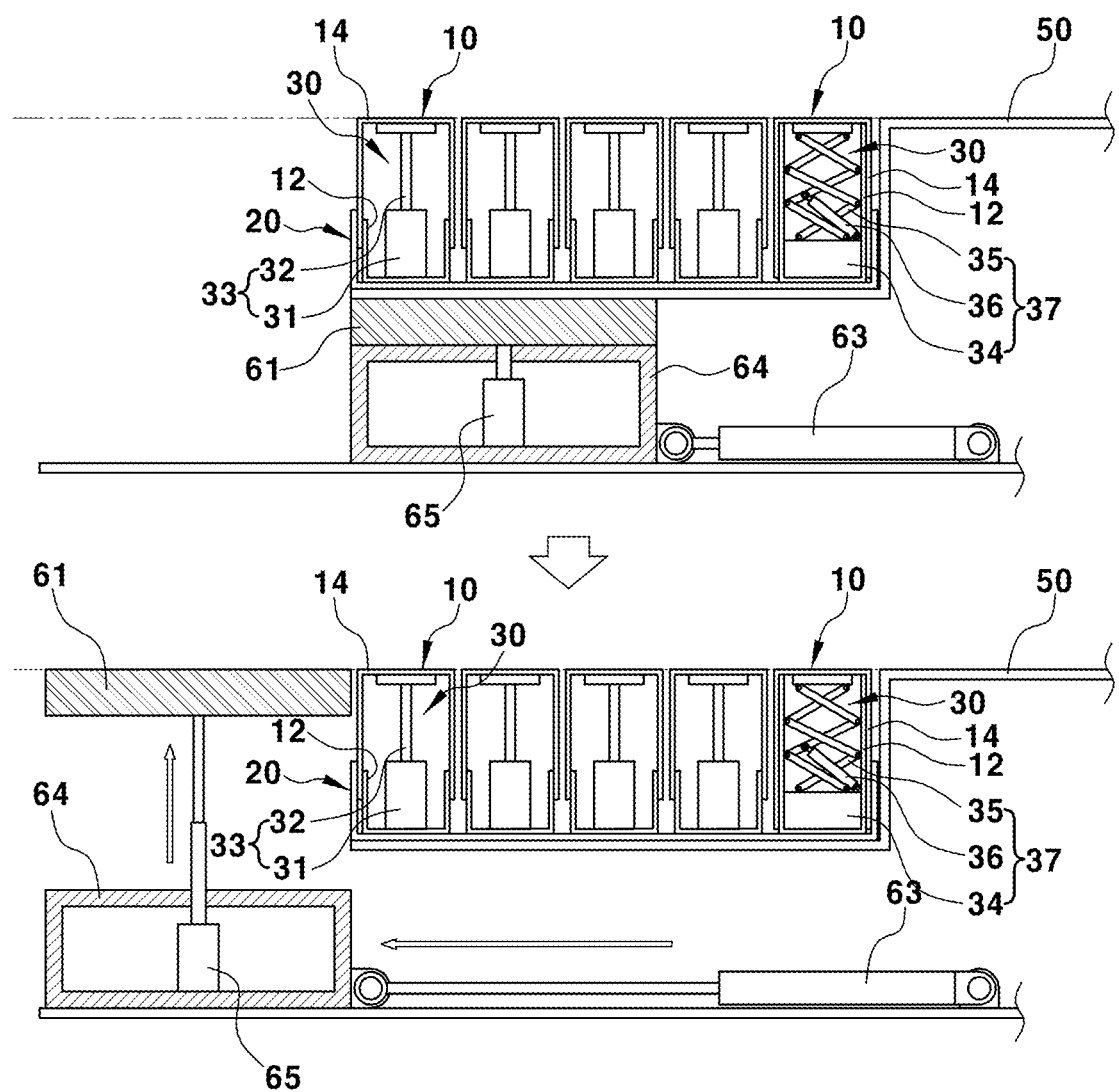
FIG. 9 is a side cross-sectional view illustrating another example in which the seat cushion extension device is mounted on the convertible seat for a vehicle according to one exemplary embodiment of the present disclosure.

FIG. 9 is a side cross-sectional view illustrating another example in which the seat cushion extension device is mounted on the convertible seat for a vehicle according to the present disclosure.

As shown in FIG. 9, the seat cushion extension device 60 may include a first actuator 63 mounted on the lower panel of the base frame 20, an extension pad support block 64 connected to a piston rod of the first actuator 63 and configured to move forward or backward, a second actuator 65 mounted on the extension pad support block 64, and an extension pad 61 connected to a piston rod of the second actuator 65 and disposed to raise and lower the extension pad support block 64.

Thus, when electric power is applied to the first actuator 63, the piston rod of the first actuator 63 moves forward to push the extension pad support block 64. Subsequently, when the electric power is applied to the second actuator 65, the piston rod of the second actuator 65 ascends to push upward the extension pad 61 so that the extension pad 61 ascends to a position which is coplanar with the individual blocks 10.

In this way, in the full-bed mode, the extension pad 61 may be deployed to the same heights as the individual blocks 10, which makes it possible to allow the user to use the extension pad 61 as a more spacious sleeping and resting space.

The present disclosure provides the following effects through the above-described means for solving problems.

First, by configuring a plurality of individual blocks, serving as a seatback and a seat cushion, to be ascendable and descendable, it is possible to change a seat position in various ways according to a body type and a situation of a passenger.

Second, by adjusting a height of each individual block, it is possible to provide convenience of providing various sizes of seating spaces, such as a baby seating space and a seating space for a companion animal.

Third, it is possible to implement a full-bed mode in which each individual block is adjusted to the same height as a luggage room, thereby providing a sleeping and resting space to a user.

Fourth, a deployable extension pad of the seat cushion extension device is installed in a front end portion of a base frame so that the extension pad can be deployed in a full-bed mode to allow the user to use a more spacious sleeping and resting space.

Although the various embodiments of the present disclosure have been described in detail, the scope of the prevent disclosure is not limited to these embodiments, and various modifications and improvements made by those skilled in the art using the fundamental concept of the present disclosure, which is defined by the appended claims, may also fall within the scope of the present disclosure.

What is claimed is:

1. A convertible seat for a vehicle, comprising:
   a base frame having a predetermined dimension of storage space;
   a plurality of individual blocks disposed to be ascendable and descendable in the storage space of the base frame; and
   a raising and lowering drive device installed in each of the individual blocks and configured to raise and lower a corresponding one of the individual blocks.

2. The convertible seat of claim 1, wherein each of the individual blocks includes:
   a fixed block fixed to the base frame; and
   an ascending and descending block disposed to be ascendable and descendable and to surround the fixed block.

3. The convertible seat of claim 2, wherein the raising and lowering drive device is employed as a linear actuator including a cylinder mounted on a bottom of the fixed block of the corresponding one of the individual blocks, and a piston rod connected to the ascending and descending block of the corresponding one of the individual blocks.

4. The convertible seat of claim 2, wherein the raising and lowering drive device is employed as a scissor lift device including a base mounted on a bottom of the fixed block of the corresponding one of the individual blocks, a scissor frame having a lower end portion connected to the base and an upper end portion connected to the ascending and descending block of the corresponding one of the individual blocks, and an electric cylinder mounted on the scissor frame and configured to raise and lower the scissor frame.

5. The convertible seat of claim 1, further comprising:
   a controller;
   a pressure sensor configured to detect a body pressure of a passenger and to transmit a detection signal to the controller, the pressure sensor being mounted on each individual block; and
   a proximity sensor configured to detect whether the passenger is seated and to transmit a detection signal to the controller, the proximity sensor being mounted on an individual block serving as a seatback among the individual blocks.

6. The convertible seat of claim 5, wherein the controller is configured to:
   receive signals from pressure sensors, which actually sense the body pressure of the passenger, among the pressure sensors installed in the individual blocks,
   calculate an average pressure out of magnitudes of the pressure sensors, which actually sense the body pressure of the passenger,
   calculate a magnitude of an individual pressure of each of the pressure sensors which actually sense the body pressure of the passenger, and
   control driving of the raising and lowering drive device in the corresponding one of the individual blocks, on which the individual pressure acts, in an ascending or descending direction according to a result of comparing the magnitude of the individual pressure with the average pressure.

7. The convertible seat of claim 6, wherein the controller is further configured to:
   control driving of the raising and lowering drive device in the corresponding one of the individual blocks, on which the individual pressure acts, in an ascending direction when the magnitude of the individual pressure is smaller than the average pressure,
   control the driving of the raising and lowering drive device in the corresponding one of the individual blocks, on which the individual pressure acts, in a descending direction when the magnitude of the individual pressure is greater than the average pressure, and
   stop the driving of the raising and lowering drive device in the corresponding one of the individual blocks, on which the individual pressure acts, when the magnitude of the individual pressure is equal to the average pressure.

8. The convertible seat of claim 6, wherein when the controller receives a pressure detection signal of a pressure sensor actually sensing the body pressure of the passenger among the pressure sensors installed in the individual blocks and then receives a detection signal of the proximity sensor, the controller is further configured to control driving of the raising and lowering drive devices in individual blocks disposed at a periphery of the individual block on which the body pressure of the passenger actually acts, in the ascending direction.

9. The convertible seat of claim 5, wherein, in order to switch to a desired seat deformation mode, the controller is configured to selectively raise and lower the individual blocks according to a desired height and to store positions of the height-adjusted individual blocks in a memory.

10. The convertible seat of claim 9, wherein the seat deformation mode is any one selected from among a default seating mode, a child seat mode, and a full-bed mode.

11. The convertible seat of claim 1, further comprising a seat cushion extension device mounted at a front end portion and a bottom position of the base frame,
    wherein the seat cushion extension device includes:
    an extension pad mounted in the front end portion of the base frame using a hinge; and
    a single actuator including a cylinder mounted on a lower panel of the base frame and a piston rod connected to a bottom portion of the extension pad using a hinge.

12. The convertible seat of claim 1, further comprising a seat cushion extension device mounted at a front end portion and a bottom position of the base frame,
    wherein the seat cushion extension device includes:
    a first actuator mounted on a lower panel of the base frame;
    an extension pad support block connected to a piston rod of the first actuator and configured to move forward or backward;
    a second actuator mounted on the extension pad support block; and
    an extension pad connected to a piston rod of the second actuator, disposed on the extension pad support block, and configured to ascend and descend together with the piston rod of the second actuator when the piston rod of the second actuator ascends and descends.

\* \* \* \* \*